(12) United States Patent
Liu et al.

(10) Patent No.: US 12,175,250 B2
(45) Date of Patent: Dec. 24, 2024

(54) COMPUTING DEVICE AND METHOD FOR FUSING AND EXECUTING VECTOR INSTRUCTIONS

(71) Applicant: T-HEAD (SHANGHAI) SEMICONDUCTOR CO., LTD., Shanghai (CN)

(72) Inventors: Dongqi Liu, Hangzhou (CN); Haowen Chen, Hangzhou (CN); Zhao Jiang, Hangzhou (CN); Chang Liu, Pudong (CN); Dingyan Wei, Hangzhou (CN); Wenjian Xu, Pudong (CN); Tao Jiang, Hangzhou (CN)

(73) Assignee: C-SKY MICROSYSTEMS CO., LTD., Hangzhou (CN)

( * ) Notice: Subject to any disclaimer, the term of this patent is extended or adjusted under 35 U.S.C. 154(b) by 21 days.

(21) Appl. No.: 18/148,654

(22) Filed: Dec. 30, 2022

(65) Prior Publication Data
US 2023/0401060 A1 Dec. 14, 2023

(30) Foreign Application Priority Data
Jun. 14, 2022 (CN) .......................... 202210667351.2

(51) Int. Cl.
*G06F 9/38* (2018.01)
*G06F 9/30* (2018.01)

(52) U.S. Cl.
CPC ........ *G06F 9/3853* (2013.01); *G06F 9/30036* (2013.01)

(58) Field of Classification Search
CPC . G06F 9/3853; G06F 9/30189; G06F 9/30036
See application file for complete search history.

(56) References Cited

U.S. PATENT DOCUMENTS

| | | | |
|---|---|---|---|
| 2007/0038844 A1* | 2/2007 | Valentine | G06F 9/3853 712/219 |
| 2014/0089639 A1* | 3/2014 | Diewald | G06F 9/3867 712/215 |

(Continued)

OTHER PUBLICATIONS

"RISC-V "V" Vector Extension Version 1.0", Sep. 20, pp. 1-111, Retrieved from https://github.com/riscv/riscv-v-spec/releases/tag/v1.0 (Year: 2021).*

(Continued)

*Primary Examiner* — Courtney P Spann
(74) *Attorney, Agent, or Firm* — Foley & Lardner LLP (57) ABSTRACT

The embodiments of the present application provide a processing unit. The processing unit comprises: an instruction fetching unit configured for fusing instruction of vector configuration instruction and vector operation instruction that are adjacent in order to obtain fusion instruction; an instruction decoding unit configured to decode the fusion instruction to obtain first execution information and second execution information; a vector configuration unit configured to execute the vector configuration instruction according to the first execution information, modify vector control register, and bypass the value of the modified vector control register to the vector operation unit; the vector operation unit configured to execute the vector operation instruction according to the second execution information and the value of the modified vector control register.

12 Claims, 4 Drawing Sheets

(56) References Cited

U.S. PATENT DOCUMENTS

2022/0050684 A1    2/2022  Orzol et al.
2023/0068290 A1*   3/2023  Li .......................... G06F 9/384

OTHER PUBLICATIONS

Extended European Search Report issued by the European Patent Office for corresponding EP Application No. 22217388.2 on Nov. 2, 2023, 10 pages.

* cited by examiner

COMPUTING DEVICE AND METHOD FOR FUSING AND EXECUTING VECTOR INSTRUCTIONS

CROSS REFERENCE

This patent application claims the priority of Chinese Patent Application No. 202210667351.2, entitled "PROCESSING UNIT, COMPUTING DEVICE AND INSTRUCTION PROCESSING METHOD" filed on Jun. 14, 2022, the application of which is incorporated by reference herein in its entirety.

TECHNICAL FIELD

The embodiment of the present application relates to the field of chip technology, in particular to a processing unit, a computing device and an instruction processing method.

BACKGROUND

In high-performance processing units, vector operation instruction is often required to be processed. The execution of vector operation instruction requires multiple pieces of execution information, such as instruction type, element width, element number, register grouping, and rounding type. Due to the limitation of instruction length and the consideration of enhancing program universality, all execution information will not be encoded in the instruction code of a vector operation instruction. For example, the instruction type is included in the instruction code of a vector operation instruction, while the element width, the element number, the register grouping and the rounding type are configured through vector control register. In the process of vector operation, the vector control register might need to be modified frequently to change operand width of the vector operation.

At present, the vector operation instruction needs to wait for the vector configuration instruction to configure the vector control register first, and then, after the configuration vector control register takes effect, executes the vector operation instruction based on the updated execution information.

However, because the vector operation instruction needs to wait for the configuration result of the vector configuration instruction on the vector control register, the vector operation instruction needs to be executed after the completion of the vector configuration instruction, resulting in a large execution delay between the vector configuration instruction and the vector operation instruction, which further leads to a low efficiency of the processing unit in vector operation.

SUMMARY

In view of this, the embodiments of the present application provide a processing unit, a computing device and an instruction processing method to at least solve or mitigate the above issues.

According to the first aspect of the embodiment of the present application, a processing unit is provided, comprising: an instruction fetching unit, which is configured to, in response to a vector configuration instruction and a vector operation instruction that are adjacent in order have been detected, fuse the vector configuration instruction and the vector operation instruction to obtain a fusion instruction; an instruction decoding unit, which is configured to decode the fusion instruction to obtain first execution information corresponding to the vector configuration instruction and second execution information corresponding to the vector operation instruction; a vector configuration unit, which is configured to execute, according to the first execution information, the vector configuration instruction to modify a vector control register and bypass a value of the modified vector control register to a vector operation unit; the vector operation unit, which is configured to execute the vector operation instruction according to the second execution information and the value of the modified vector control register.

According to the second aspect of the embodiment of the present application, a computing device is provided, comprising: the processing unit described in the first aspect; a memory, which is coupled to the processing unit to store the vector configuration instruction and the vector operation instruction.

According to the third aspect of the embodiment of the present application, an instruction processing method is provided, comprising: in response to detecting that a vector configuration instruction and a vector operation instruction are adjacent in order, fusing the vector configuration instruction and vector operation instruction to obtain a fusion instruction; decoding the fusion instruction to obtain first execution information corresponding to the vector configuration instruction and second execution information corresponding to the vector operation instruction; executing, by a vector configuration unit, according to the first execution information, the vector configuration instruction to modify a vector control register and bypassing a value of the modified vector control register to a vector operation unit; executing, by the vector operation unit, the vector operation instruction according to the second execution information and the value of the modified vector control register.

According to the instruction fusion scheme provided by the embodiments of the present application, after the instruction fetching unit fuses the vector configuration instruction and the vector operation instruction that are adjacent in order into one fusion instruction, the fusion instruction is decoded by the instruction decoding unit, so that the vector configuration instruction and the vector operation instruction can be executed at the same time. After the vector configuration unit modifies the vector control register by executing the vector configuration instruction, the value of the modified vector control register is bypassed to the vector operation unit, and the vector operation unit executes the vector operation instruction based on the value of the modified vector control register obtained by the bypass. Through the instruction fusion of the vector configuration instruction and the vector operation instruction, the modification result of the vector control register by the vector configuration instruction is bypassed to the vector operation unit, the vector operation unit does not need to wait for the completion of vector configuration instruction before executing vector operation instruction, so that the vector configuration instruction and the vector operation instruction can be executed simultaneously, and therefore the execution delay between the vector configuration instruction and the vector operation instruction has been shortened, and the efficiency of the vector operation performed by the processing unit 12 can be improved.

BRIEF DESCRIPTION OF THE DRAWINGS

In order to describe the embodiments of the present application or the technical solution of the prior art more clearly, briefly introduction of the drawings needed to be used in the embodiments or the prior technical will be description below. Obviously, the drawings in the following description are only some embodiments recorded in the embodiments of the present application. Other drawings can also be obtained according to these drawings for the ordinary technicians of this field.

DETAILED DESCRIPTION

The application is described below based on the embodiments, but the application is not limited to these embodiments. In the following detailed description of the application, some specific details are described in detail. It is possible for a person having ordinary skill in the art to fully understand the application without the description of these details. In order to avoid confusing the essence of the application, those well-known methods, processes and procedures are not described in detail. In addition, the drawings are not necessarily drawn to scale.

First, some nouns or terms appearing in the process of describing the embodiments of the application are applicable to the following explanations.

Instruction fusion: combine two or more adjacent instructions in the instruction sequence into one instruction to reduce resources used by subsequent instruction processing.

Vector operation: vector operation is an operation mode that can generate execution results of multiple elements in parallel. That is, for similar operations, such as the calculation of profit for each kind of goods, the unit price, sales quantity and profit margin of multiple goods can be obtained, according to the requirements such as register capacity, at one time for parallel calculation.

Element: element is an operation object of one calculation in parallel calculation of vector operation. In the above example of parallel calculation of unit price, sales quantity and profit rate of multiple goods obtained at one time, these unit prices, sales quantity and profit rate are vector elements, and the number of elements contained in the vector is the number of elements that can run in parallel at single time.

Vector operation instruction: an instruction used to execute the above vector operation. For example, vadd.vvv8, v8, v4 is a vector addition instruction, wherein, v8, v8, and v4 are operands used by the instruction.

Vector parameters: Vector parameters are resource configuration parameters used for executing vector operation instruction, such as size of elements in the vector and the number of elements in a single operation. Vector parameters are not operands in a vector operation instruction. Operands are objects of the vector operations. Vector parameters are not objects of the vector operations, but reflects the resources (such as the number of bits in a register) allocated during the vector operation.

Element size in a vector: The element size in a vector means the number of bits an element in the vector occupies in a vector register. Assume that the total width of the vector register is 128 bits, and the number of bits occupied by an element in the vector determines the maximum number of elements that the vector register can accommodate, that is, the maximum number of elements that can be operated in parallel at the same time. For example, if one element in the vector occupies 16 bits, the vector register can accommodate up to 8 elements at the same time, and can allow up to 8 elements to operate in parallel simultaneously.

Vector configuration instruction: An instruction that is separated from vector operation instruction and is used to configure vector parameters used in vector operation instruction. Because coding vector parameters directly into vector operation instruction does no good to the reuse of software code segments, specialized vector configuration instruction is used to configure vector parameters uniformly, and the configured vector parameters may be reused by subsequent multiple vector operation instruction.

Computing Device

Figure 1:
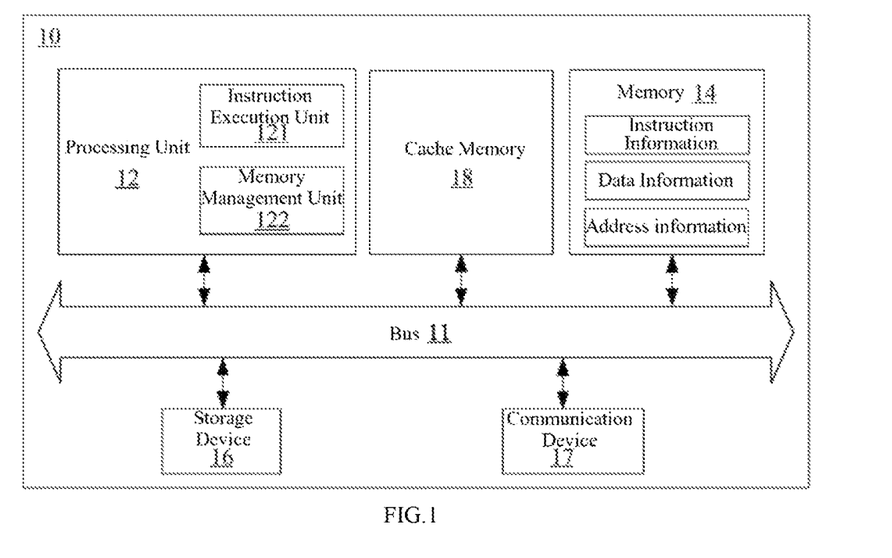
FIG. 1 is a schematic diagram of a computing device used in an embodiment of the present application.

FIG. 1 shows a schematic block diagram of a computing device 10. The computing device 10 can be constructed based on various types of processing units and driven by any operating system, such as WINDOWS operating system, UNIX operating system and Linux operating system. In addition, the computing device 10 may be implemented in hardware and/or software, such as PC, desktop, laptop, server, and mobile communication device.

As shown in FIG. 1, the computing device 10 may include a memory 14 and one or more processing units 12. The memory 14 in the computing device 10 can be used as a main memory (hereinafter referred to as main memory or internal memory) to store instruction information and/or data information represented by data signals. For example, the memory 14 may store data (such as budget results) provided by the processing unit 12, and may also be used to realize data exchange between the processing unit 12 and an external storage device 16 (or referred to as an auxiliary memory or external memory).

In some cases, the processing unit 12 needs to access the memory 14 through the bus 11 to obtain or modify the data in the memory 14. Since an access speed of the memory 14 is slow, in order to alleviate a speed gap between the processing unit 12 and the memory 14, the computing device 10 also includes a cache memory 18 connected to the bus 11 in communication. The cache memory 18 is used to cache in the memory 14 some program data or packet data that may be called repeatedly. The cache memory 18 may be implemented by a storage device such as a Static Random Access Memory (SRAM). The cache memory 18 may be a multi-level structure, such as a three-level cache structure with L1 Cache, L2 Cache and L3 Cache. The cache memory 18 can also be a cache structure with more than three levels or other types of cache structure. In some embodiments, a portion of the cache memory 18 (such as the first level cache, or both the first level cache and the second level cache) may be integrated within the processing unit 12 or integrated in the same on-chip system with the processing unit 12.

Based on this, the processing unit 12 may include instruction execution unit 121, memory management unit 122, and other parts. The instruction execution unit 121 initiates a write access request when executing some instructions that need to modify the memory. The write access request specifies write data, which needs to be written to the memory, and corresponding physical address. The memory management unit 122 is used to translate a virtual address specified by these instructions into a physical address mapped by the virtual address. The physical address specified by the write access request can be consistent with the physical address specified by the corresponding instruction.

The information interaction between the memory 14 and the cache memory 18 may be organized according to data block. In some embodiments, the cache memory 18 and the memory 14 can be divided into data block according to the same space, and the data block can be used as the minimum unit of data exchange between the cache memory 18 and the memory 14 (including one or more pieces of data with preset length). In order to give a brief and clear description, each data block in the cache memory 18 is hereinafter referred to as a cache block (or can be referred to as a cacheline or cache line), and different cache blocks have different cache block addresses. Each data block in the memory 14 is referred to as a memory block, and different memory blocks have different memory block addresses. The cache block address and/or memory block address may include a physical address label for locating the data block.

Due to the limitation of space and resource, the cache memory 18 cannot cache all the contents in the memory 14. That is, the storage capacity of the cache memory 18 is usually smaller than the memory 14. Each cache block address provided by the cache memory 18 cannot correspond to all the memory block addresses provided by the memory 14. When the processing unit 12 needs to access the memory, the processing unit 12 accesses the cache memory 18 through the bus 11 firstly to determine whether the content to be accessed has been stored in the cache memory 18. Cache Memory 18 has been hit if the content to be accessed has been stored in the cache memory 18, and processing unit 12 directly calls the content to be accessed from the cache memory 18. If the content to be accessed has not been stored in the cache memory 18, the cache memory 18 and the processing unit 12 need to access the memory 14 via the bus 11 to find the corresponding information in the memory 14. Because the access rate of the cache memory 18 is very fast, the efficiency of the processing unit 12 may be improved significantly when the cache memory 18 has been hit, and therefore the performance and efficiency of the entire computing device 10 have been improving.

In addition, the computing device 10 may also include input/output devices, such as storage device 16, display device, audio device, mouse/keyboard and the like. The storage device 16 may be a device, such as a hard disk, optical disk, flash memory and the like, used for storing and accessing information which is coupled to bus 11 through a corresponding interface. The display device may be coupled to the bus 11 through the corresponding display card to display according to the display signal provided by the bus 11.

The computing device 10 may also include a communication device 17, and therefore the computing device 10 may communicate with a network or other devices in various ways. The communication device 17 may include one or more communication modules, and the communication device 17 may include a wireless communication module suitable for a particular wireless communication protocol. For example, the communication device 17 may include a WLAN module to realize the WiFi communication in accordance with the 802.11 standard established by the Institute of Electrical and Electronic Engineers (IEEE). The communication device 17 can include a WWAN module for wireless wide area communication in accordance with cellular or other wireless wide area protocols. The communication device 17 may also include a communication module using other protocols, such as a Bluetooth module, or other customized communication modules. The communication device 17 may also be a port for serial transmission of data.

It should be noted that the structure of different computing devices 10 may vary depending on mainboard, operating system and instruction set architecture. For example, at present, many computing devices are provided with an input/output control center connected between the bus 11 and various input/output devices, and the input/output control center may be integrated within the processing unit 12 or independent with the processing unit 12.

Processing Unit

Figure 2:
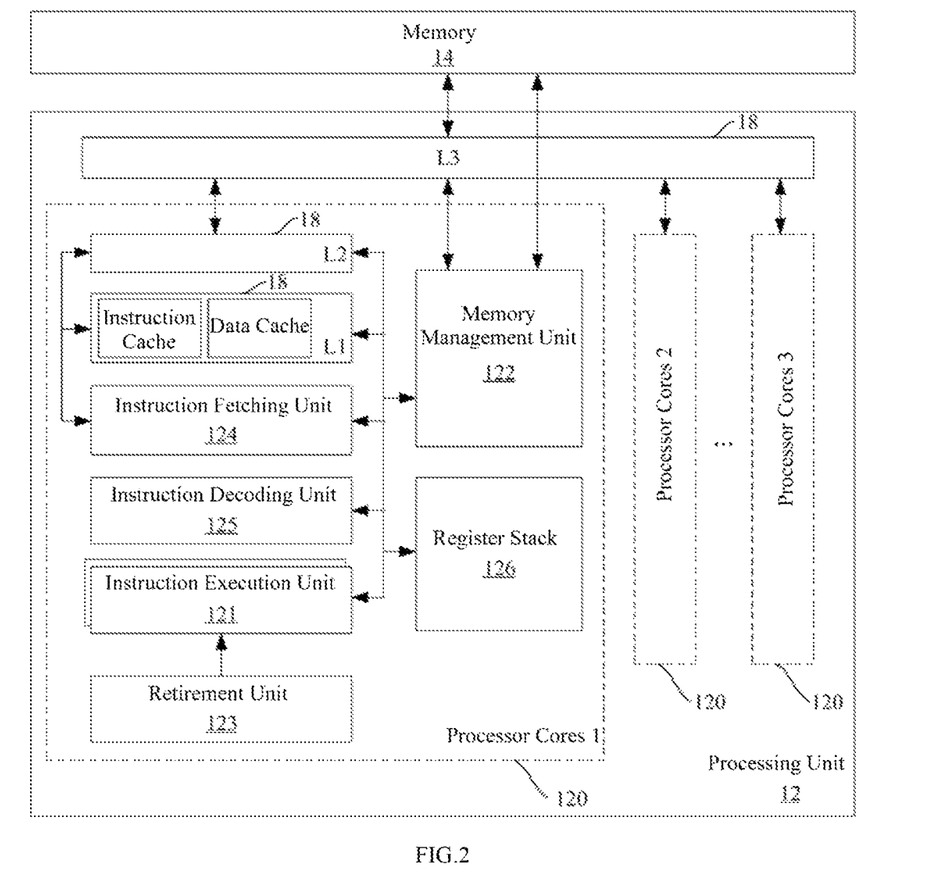
FIG. 2 is a schematic diagram of a processing unit according to an embodiment of the present application.

FIG. 2 is a schematic block diagram of the processing unit 12 according to one embodiment of the present application. As shown in FIG. 2, each processing unit 12 may include one or more processor cores 120 for processing instructions, and the processing and execution of instructions may be controlled by a user (for example, through an application program) and/or the system platform. Each processor core 120 may be used to process a specific instruction set. The instruction set can support Complex Instruction Set Computing (CISC), Reduced Instruction Set Computing (RISC) or computing based on Very Long Instruction Word (VLIW). In particular, processor core 120 is applicable to processing RISC-V instruction set. Different processor cores 120 may each process different instruction sets or the same instruction set. The processor core 120 may also include other processing modules, such as Digital Signal Processor (DSP), etc. As an example, FIG. 2 shows processor core 1 to processor core m, and m is a positive integer.

FIG. 1 shows the cache memory 18 may be fully or partially integrated in the processing unit 12. According to different architectures, the cache memory 18 may be a single or multi-level internal cache memory located within and/or outside each processor core 120 (the three-level cache memories L1 to L3 as shown in FIG. 2, uniformly identified as 18 in FIG. 2), and may also include instruction cache oriented to instruction and data cache oriented to data. Each component in the processing unit 12 may share at least part of the cache memory. For example, processor cores 1 to processor cores m may share the third level cache memory L3. The processing unit 12 may also include external cache (not shown), and other cache structures may also be used as an external cache of the processing unit 12.

As shown in FIG. 2, the processing unit 12 may include a Register File 126. The Register File 126 may include multiple registers for storing different types of data and/or instructions. These registers may be of different types. For example, the register stack 126 may include integer register, floating point register, status register, instruction register and pointer register, etc. The registers in the register stack 126 may be implemented by using general registers, or by specialized designs which is adopted according to actual requirements of the processing unit 12.

The processing unit 12 may include a Memory Management unit (MMU) 122 for translating virtual address to physical address. The memory management unit 122 caches part of table entries in page table, and the memory management unit 122 may also obtain, from the memory, the table entries that are not cached. One or more memory management units 122 can be set in each processor core 120, and memory management units 122 in different processor cores 120 may synchronize with memory management units 122 located in other processing units or processor cores, so that each processing unit or processor core may share a unified virtual storage system.

The processing unit 12 is used to execute a sequence of instructions (such as a program). The process of executing each instruction by the processing unit 12 includes: fetching an instruction from the memory where the instruction is stored, decoding the fetched instruction, executing the decoded instruction, and holding the instruction execution result, and so on until all instructions in the instruction sequence are executed or a shutdown instruction is encountered.

In order to implement the above process, the processing unit 12 may include instruction fetching unit 124, instruction decoding unit 125, instruction transmitting unit (not shown), instruction executing unit 121, retirement unit 123, and the like.

The instruction fetching unit 124, as a starting engine of the processing unit 12, is used to move instruction from the memory 14 to the instruction register (which may be one register for storing instructions in register stacks 126 shown in FIG. 2), and receive a next instruction fetching address or calculate a next instruction fetching address according to an instruction fetching algorithm. The instruction fetching algorithm may increase address or decrease address according to instruction length.

After the instruction is fetched, the processing unit 12 enters an instruction decoding stage, and the instruction decoding unit 125 decodes the fetched instruction according to the predetermined instruction format to obtain operand acquisition information required by the fetched instruction, so as to prepare for the operation of the instruction execution unit 121. The operand acquisition information may include software/hardware that points to immediate data, a register, or other sources which can provide operand.

The instruction transmitting unit usually exists in the high-performance processing unit 12, which is located between the instruction decoding unit 125 and the instruction execution unit 121. The instruction transmitting unit is used for scheduling and controlling instructions to efficiently allocate each instruction to different instruction execution units 121, to enable parallel operation of multiple instructions. After the instruction is fetched, decoded and scheduled to the corresponding instruction execution unit 121, the corresponding instruction execution unit 121 starts to execute the instruction, that is, to execute the operation indicated by the instruction, to realize the corresponding function.

The retirement unit 123 (or referred to as instruction retirement unit or instruction writeback unit) is mainly used to write an instruction execution result, which is generated by the instruction execution unit 121, back to a corresponding storage location (for example, a register in the processing unit 12), so that a subsequent instruction can quickly obtain the corresponding execution result from the storage location.

Different instruction execution units 121 may be set in the processing unit 12 for different types of instructions. The instruction execution unit 121 may be an operation unit (including, for example, arithmetic logic unit, shaping processing unit, vector operation unit, vector configuration unit, and the like, for performing operations according to operand and outputting operation result), a memory execution unit (for example, for accessing memory according to instructions to read data from memory or write specified data to memory, and the like), a coprocessor, and the like. In the processing unit 12, each instruction execution unit 121 may operate in parallel and output corresponding execution result.

When executing certain kinds of instructions (such as memory access instruction), the instruction execution unit 121 needs to access the memory 14 to obtain information stored in the memory 14 or provide data to be written into the memory 14. It should be noted that the instruction execution unit 121 for executing memory access instructions may also be referred to as a memory execution unit. The memory execution unit may be a Load Store Unit (LSU) and/or other units for memory access.

After the memory access instruction is acquired by the instruction fetching unit 124, the instruction decoding unit 125 may decode the memory access instruction so that the source operand of the memory access instruction may be acquired. The memory access instruction after decoding processing is provided to the corresponding instruction execution unit 121, and the corresponding instruction execution unit 121 may perform corresponding operations on the source operand of the memory access instruction (for example, the source operand stored in the register is operated by arithmetic logic unit) to obtain the address information corresponding to the memory access instruction, and send corresponding requests according to the address information, such as address translation request, write access request, etc.

The source operand of the memory access instruction usually includes address operand, and the address operand is calculated by the instruction execution unit 121 to obtain the virtual address or physical address corresponding to the memory access instruction. When the memory management unit 122 is disabled, the instruction execution unit 121 may directly obtain the physical address of the memory access instruction through logical operation. When the memory management unit 121 is enabled, the corresponding instruction execution unit 121 initiates, according to the virtual address corresponding to the memory access instruction, an address translation request. The address translation request includes the virtual address corresponding to the address operand of the memory access instruction. The memory management unit 122 responds to the address translation request and converts the virtual address in the address translation request into a physical address according to table entry which has been matched to the virtual address, so that the instruction execution unit 121 may access the cache memory 18 and/or memory 14 according to the translated physical address.

According to the different functions, the memory access instruction may include load instruction and storage instruction. The execution process of the load instruction usually does not need to modify the information in the memory 14 or the cache memory 18, and the instruction execution unit 121 only needs to read, according to the address operand of the load instruction, the data stored in the memory 14, the cache memory 18 or the external storage device. Different from the load instruction, the source operand of the storage instruction includes not only the address operand, but also the data information. The execution process of the storage instruction usually requires to modify the information in the memory 14 and/or the cache memory 18. The data information of the storage instruction may point to the written data. The source of the written data may be the execution result of an operation instruction, a load instruction, etc., or the data provided by the register in the processing unit 12 or other storage units, or it can be an immediate data.

At present, in response to determining that the instruction sequence includes vector configuration instruction and vector operation instruction that are adjacent in order, the vector configuration unit needs to first execute the vector configuration instruction to modify the vector control register, so that the vector parameters defined in the vector control register satisfy operation requirements of the vector operation instruction, and then the vector operation unit obtains the vector parameters by reading the value of the vector control register, to execute the vector operation instruction based on the obtained vector parameters. Since the vector operation instruction does not start to execute until the execution of the vector configuration instruction is complete, there is a large execution delay between the vector configuration instruction and the vector operation instruction, which leads to low efficiency of the processing unit 12 in vector operation.

The embodiment of the application is generated to solve the problem that the processing unit 12 has low efficiency in vector operation. It is mainly realized by instruction fetching unit 124, instruction decoding unit 125 and instruction execution unit 121, which are all included in the processing unit 12. The process of executing the vector configuration instruction and the vector operation instruction by the processing unit 12 is discussed in detail below.

Figure 3:
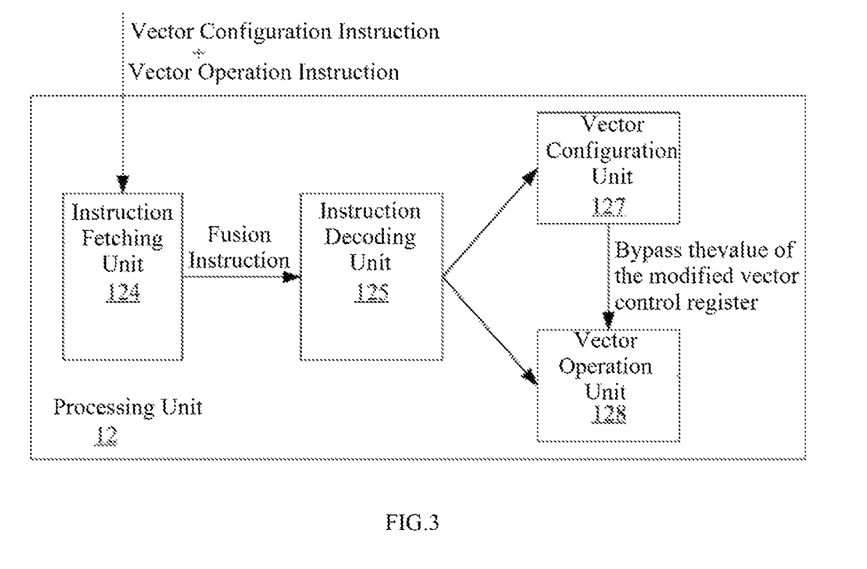
FIG. 3 is a schematic diagram of a processing unit according to another embodiment of the present application.

FIG. 3 is a schematic diagram of the internal structure of the processing unit 12 according to one embodiment of the present application. As shown in FIG. 3, the processing unit 12 includes instruction fetching unit 124, instruction decoding unit 125, vector configuration unit 127, and vector operation unit 128. In response to the instruction fetching unit 124 detecting vector configuration instruction and vector operation instruction that are adjacent in order, the instruction fetching unit 124 can perform instruction fusion on vector configuration instruction and vector operation instruction to obtain fusion instruction. The instruction decoding unit 125 may decode the fusion instruction to obtain first execution information corresponding to the vector configuration instruction and second execution information corresponding to the vector operation instruction. The vector configuration unit 127 may execute the vector configuration instruction according to the first execution information to modify the vector control register, and bypass a value of the modified vector control register to the vector operation unit 128.

The instruction fetching unit 124 may detect the instruction sequence to determine whether there are vector configuration instruction and vector operation instruction adjacent in order in the instruction sequence. In response to detecting that the vector configuration instruction and the vector operation instruction are adjacent in order, the instruction fetching unit 124 may perform instruction fusion between the vector configuration instruction and the vector operation instruction that are adjacent in order to obtain the fusion instruction.

It should be understood that the vector configuration instruction and the vector operation instruction that are adjacent in order means that they are adjacent in the instruction sequence, and the vector configuration instruction is before the vector operation instruction. For example, the instruction sequence includes instructions 1 to 64, wherein, instruction 6 is a vector configuration instruction and instruction 7 is a vector operation instruction, then instruction 6 and instruction 7 are the vector configuration instruction and the vector operation instruction that are adjacent in order, and the instruction fusion may be performed on instruction 6 and instruction 7.

After the instruction decoding unit 125 decodes the fusion instruction, it may obtain the first execution information and the second execution information. The first execution information includes execution information, such as the register index, immediate size, by the vector configuration instruction, and the second execution information includes execution information, such as register index, immediate size, carried by the vector operation instruction.

The vector configuration unit 127 executes the vector configuration instruction according to the first execution information, modifies the vector control register, and generates a vector control register modification bypass request, and bypasses the modified result of the execution vector control register to the vector operation unit 128, that is, the vector configuration unit 127 bypasses the value of the modified the vector control register to the vector operation unit 128.

In the embodiment of the application, after the instruction unit 124 fuses the vector configuration instruction and the vector operation instruction which are adjacent in order into one fusion instruction, after the fusion instruction is decoded by the instruction decoding unit 125, the vector configuration instruction and the vector operation instruction can be executed simultaneously. After the vector configuration unit 127 modifies the vector control register by execute the vector configuration instruction, the value of the modified vector control register is bypassed to the vector operation unit 128, and the vector operation unit 128 executes the vector operation instruction based on the value of the modified vector control register acquired by the bypass. Through the instruction fusion of the vector configuration instruction and the vector operation instruction, the modification result of vector control register by vector configuration instruction is bypassed to vector operation unit 128. Vector operation unit 128 does not need to wait for the completion of the vector configuration instruction before executing vector operation instruction, so that the vector configuration instruction and the vector operation instruction can be executed simultaneously, and therefore the execution delay between the vector configuration instruction and the vector operation instruction has been shortened, and the efficiency of the vector operation performed by the processing unit 12 can be improved.

In one possible implementation mode, the instruction fetching unit 124 may decode the vector configuration instruction. The decoding result may be stored into an additional decoding domain, and instruction type information used to indicate that the fusion instruction has been obtained by fusing the vector configuration instruction and the vector operation instruction may be stored in the additional decoding domain, and then an instruction code of the vector operation instruction, which is taken as main decoding information, is fused with the additional decoding domain to obtain the fusion instruction.

Through instruction fusion, various types of instructions may be fused to obtain different types of fusion instruction. In order to enable the instruction decoding unit 125 to recognize the fusion instruction fused by the vector configuration instruction and the vector operation instruction, the instruction type information may be stored in the additional decoding field. After the instruction decoding unit 125 decodes the fused instruction, the instruction decoding unit 125 may determine, according to the instruction type information in the additional decoding domain, that the instruction is an instruction fused by the vector configuration instruction and the vector operation instruction, and then it may decode the main decoding information and the additional decoding domain respectively to obtain the first execution information and the second execution information. The instruction type information may be instruction type code. Different types of instruction correspond to different instruction type codes respectively. The fusion instruction and the non-fusion instruction also correspond to different instruction type codes respectively.

In the embodiment of the application, the instruction fetching unit 124 may pre-decode the vector configuration instruction to obtain information required for executing the vector configuration instruction. After the information obtained from decoding is integrated into the additional decoding domain, the instruction code of the vector operation instruction, which is taken as main decoding information, is fused with the additional decoding domain to obtain the fusion instruction, and then when the instruction decoding unit 125 decodes the fusion instruction, the second execution information required for executing the vector operation instruction and the first execution information required for executing the vector configuration instruction may be obtained, so that the first execution information and the second execution information may be sent, in the same clock cycle, to the vector configuration unit 127 and the vector operation unit 128 respectively, so as to make sure the vector configuration instruction and the vector operation instruction can be executed simultaneously, and therefore the execution delay between the vector configuration instruction and the vector operation instruction is reduced, thereby improving the efficiency of the processing unit 12 for vector operation, and maintaining the performance of the processing unit 12.

In one possible implementation, after receiving the fusion instruction, the instruction decoding unit 125 may decode the main decoding information included in the fusion instruction and the additional decoding domain separately, and obtain, according to the instruction type information stored in the additional decoding domain, the first execution information and the second execution information after determining the decoding object is the fusion instruction fused by the vector configuration instruction and the vector operation instruction.

After receiving the pair of instruction information marked as the fusion instruction, the instruction decoding unit 125 may decode the main decoding information of the fusion instruction and the additional decoding domain simultaneously, and determine the type of the fusion instruction. After the instruction decoding unit 125 determines, based on the instruction type information, that the fusion instruction is an instruction fused by the vector configuration instruction and the vector operation instruction, the instruction decoding unit 125 may prepare, according to the additional decoding domain, information needed for accurately synchronizing the execution of the vector operation instruction and the vector configuration instruction, that is, prepare the first execution information required for executing the vector configuration instruction and prepare the second execution information required for executing the vector operation instruction.

In the embodiment of the present application, the main decoding information of the fusion instruction includes the instruction code of the vector operation instruction, and the additional decoding domain includes the pre-decoding information of the vector configuration instruction. The instruction decoding unit 125 decodes the main decoding information of the fusion instruction and the additional decoding domain simultaneously, so that the first execution information required for executing the vector configuration instruction and the second execution information required for executing the vector operation instruction may be obtained synchronously, and then the vector configuration unit and the vector operation unit may synchronously execute the vector configuration instruction and the vector operation instruction. Therefore, the execution delay between the vector configuration instruction and the vector operation instruction is reduced, and the efficiency of the processing unit 12 in performing the vector operation is improved.

In one possible implementation, the first execution information includes at least one of the following: general register value, general register number, destination general register number, and the instruction decoding information, and the second execution information includes at least one of the following: source vector register value, destination vector register number, and the instruction decoding information.

In the embodiment of the application, the first execution information is the information required for executing the vector configuration instruction, and the second instruction information is the information required for executing the vector operation instruction. The first execution information includes information, such as the general register value, the general register number, the destination general register number and the instruction decoding information of the vector configuration instruction, and the second execution information includes the source vector register value, the destination vector register number and the instruction decoding information of the vector operation instruction, ensuring that the vector configuration unit 127 may correctly modify the vector control register based on the first execution information, and also ensuring that the vector operation unit 128 may correctly perform vector operation based on the second execution information and the value of the modified vector control register, and ensuring the correctness of the vector operation result.

Figure 4:
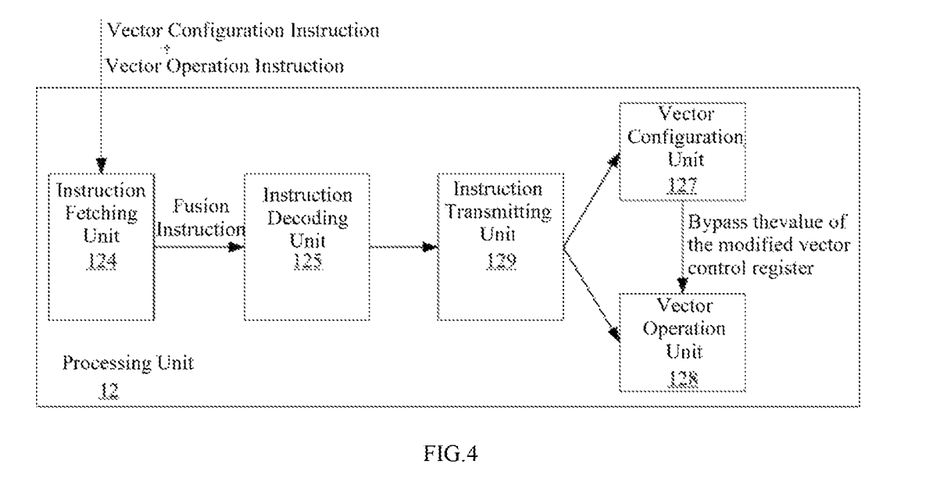
FIG. 4 is a schematic diagram of a processing unit according to yet another embodiment of the present application.

FIG. 4 is a schematic diagram of an internal structure of a processing unit according to yet another embodiment of the present application. As shown in FIG. 4, the instruction processing unit 12 may also include an instruction transmitting unit 129. When the instruction transmitting unit 129 sends the fusion instruction to the vector configuration unit 127 and the vector operation unit 128 for execution, the instruction transmitting unit 129 may assign an instruction identifier to the fusion instruction. The instruction identifier is used to determine the new-old relationship between different instructions, and the instruction identifiers of the vector configuration instruction and the vector operation instruction are the same as the instruction identifiers of the fusion instruction. The instruction transmitting unit 129 may also transmit the first execution information to the vector configuration unit 127 and transmit the second execution information to the vector operation unit 128, so that the vector configuration unit 127 executes the vector configuration instruction based on the first execution information and the vector operation unit 128 executes the vector operation instruction based on the second execution information.

The instruction transmitting unit 129 assigns a unique instruction identifier in a pipeline of the fusion instruction, and the new-old relationship between two instructions in the pipeline may be determined according to the instruction identifier. The new-old relationship between two instructions refers to the sequential position of these two instructions in the pipeline. An older instruction is in front of a newer instruction in the pipeline. An instruction identifier may be an instruction ID. Different instructions in the pipeline have different instruction IDs. The instruction identifier may be incremented or decremented according to the instruction sequence. When the instruction identifier is incremented according to the instruction sequence, an instruction with large instruction identifier is newer than an instruction with small instruction identifier. When the instruction identifier is decremented according to the instruction sequence, an instruction with large instruction identifier is older than an instruction with small instruction identifier.

In the embodiment of the application, when transmitting the fusion instruction, the instruction transmitting unit 129 may assign an instruction identifier for the fusion instruction, and the vector configuration instruction and the vector operation instruction have the same instruction identifier with the fusion instruction. The new-old relationship of the instruction may be determined by the instruction identifier, and the vector operation unit 128 may execute, according to the instruction identifier of the instruction, the instruction by using the value of the vector control register before modification, or by using the value of the modified vector control register, thereby ensuring that the vector operation can be conducted normally, and therefore ensuring the accuracy of the vector operation result.

In one possible implementation, after receiving the value of the modified vector control register bypassed by the vector configuration unit 127, the vector operation unit 128 determines whether the instruction identifier of the currently executed instruction is same with the instruction identifier of the vector configuration instruction. If the instruction identifier of the current instruction executed by the vector operation unit 128 is same with the instruction identifier of the vector configuration instruction, then the value of the modified vector control register is used to execute the currently executed instruction.

In the embodiment of the application, when the vector operation unit 128 acquires the value of the modified vector control register bypassed by the vector configuration unit 127, the instruction identifier of the vector configuration instruction that modifies the vector control register may also obtained synchronously. Since the vector configuration instruction and the vector operation instruction have the same instruction identifier with the fusion instruction, the vector operation unit 128 may determine whether the instruction identifier of the currently executed instruction is same with the instruction identifier of the vector configuration instruction. If the instruction identifier of the currently executed instruction is same with the instruction identifier of the vector configuration instruction, it means that the currently executed instruction is the vector operation instruction which has been fused with the vector configuration instruction to obtain the fused instruction. Furthermore, the vector operation unit 128 executes the currently executed instruction by using the value of the modified vector control register, thereby ensuring the accuracy of the execution result of the vector operation instruction.

In one possible implementation, if the vector operation unit 128 determines that the instruction identifier of the currently executed instruction is different from the instruction identifier of the vector configuration instruction, it determines, according to the instruction identifiers, an new-old relationship between the currently executed instruction and the vector configuration instruction. If the currently executed instruction is newer than the vector configuration instruction, the value of the modified vector control register is used to execute the currently executed instruction, and if the currently executed instruction is older than the vector configuration instruction, the value of the vector control register before modification is used to execute the currently executed instruction.

Since multiple instructions may be executed by the vector operation unit 128, the instruction transmitting unit 129 transmits the fusion instruction to the vector operation unit 128 and the vector configuration unit 127, and then the following conditions exist: when the vector configuration unit 127 executes the vector configuration instruction and bypasses the value of the modified vector control register to the vector operation unit 128, the vector operation unit 128 has not yet started executing the corresponding vector operation instruction, and at this time, the vector operation unit 128 should execute the currently executed instruction using the value of the vector control register before modification. After the vector operation unit 128 corresponding to the fusion instruction completes execution, if there is no other vector configuration instruction between the vector operation instruction and the subsequent vector operation instruction, the vector operation unit 128 shall use the value of the modified vector control register to execute the subsequent vector operation instruction of the vector operation instruction.

For example, the program fragment includes instructions 1 to 5 arranged in sequence, and the instructions 1 to 5 are as follows:
Instruction 1: vsetvli a6,a5,e8,m1,tu,mu
Instruction 2: vwcvtu.x.x.v v8,v12
Instruction 3: vsetvli a6,a5,e16,m2,tu,mu
Instruction 4: vwmaccu.vx v4,t2,v10
Instruction 5: vslidedown vx v2,v8,a4

Among them, instruction 1 and instruction 3 are vector configuration instructions, instruction 2, instruction 4 and instruction 5 are vector operation instructions.

Since instruction 1 and instruction 2 are vector configuration instruction and vector operation instruction which are adjacent in order, and instruction 3 and instruction 4 are vector configuration instruction and vector operation instruction which are adjacent in order, the instruction fusion may be performed for instruction 1 and instruction 2, and the instruction fusion may be performed for instruction 3 and instruction 4.

In one example, the vector configuration unit 127 executes the instruction 3, and in a case where the value of the vector control register is bypassed to the vector operation unit 128 after instruction 3 has been modified and the vector operation unit 128 is executing the instruction 2, the vector operation unit 128 executes the instruction 2 by the value of the vector control register before instruction 3 has been modified, that is, executing instruction 2 by the value of the vector control register after instruction 1 has been modified. In a case where the vector operation unit 128 executes the instruction 4, since the instruction identifier of the instruction 4 is same with the instruction identifier of the instruction 3, the vector operation unit 128 uses the value of the vector control register after instruction 3 has been modified to execute the instruction 4. Because there is no vector configuration instruction between instruction 4 and instruction 5, and instruction 5 is newer than instruction 3, the vector operation unit 128 executes step 5 using the value of the vector control register after instruction 3 has been modified.

In the embodiments of the application, the vector operation unit 128 determines the new-old relationship between the currently executed instruction and the vector configuration quality according to the instruction identifier. In response to determining that the currently executed instruction is newer than the vector configuration instruction, the value of the vector control register after the vector configuration instruction is modified is used to execute the currently executed instruction. In response to determining that the currently executed instruction is older than the vector configuration instruction, the value of the vector control register before the vector configuration instruction is modified is used to execute the currently executed instruction. While the execution delay between the vector configuration instruction and the vector operation instruction which have the same instruction identifier is reduced, correctly executing other vector operation instruction by the vector operation unit 128 is guaranteed, thereby ensuring that the processing unit 12 performs vector operation correctly.

In one possible implementation mode, after the vector configuration unit 127 receives the vector configuration instruction obtained by fusing instructions, this instruction has been executed as a normal vector configuration instruction, and generates a vector control register modification bypass request simultaneously. After bypassing the result of executing modification of the vector control register to the vector operation unit 128, in response to determining that the vector configuration instruction is completed normally and allowed to be submitted, the vector configuration instruction normally updates the configuration control register and writes back the results.

In the embodiment of the application, the vector configuration unit 127 executes the vector configuration instruction and bypasses the result of executing the modification of the vector control register to the vector operation unit 128. In response to determining the vector configuration instruction is normally executed and allowed to be submitted, the vector configuration instruction normally completes the update of the vector control register and writes back the result, thereby ensuring the correctness of the overall execution behavior.

It should be noted that, according to different application scenarios, the vector configuration instruction and the vector operation instruction may be executed by different or the same instruction execution unit. In response to determining the vector configuration instruction and the vector operation instruction are executed by the same instruction execution unit, the vector configuration unit 127 and the vector operation unit 128 are the same instruction execution unit.

Instruction Processing Method

Figure 5:
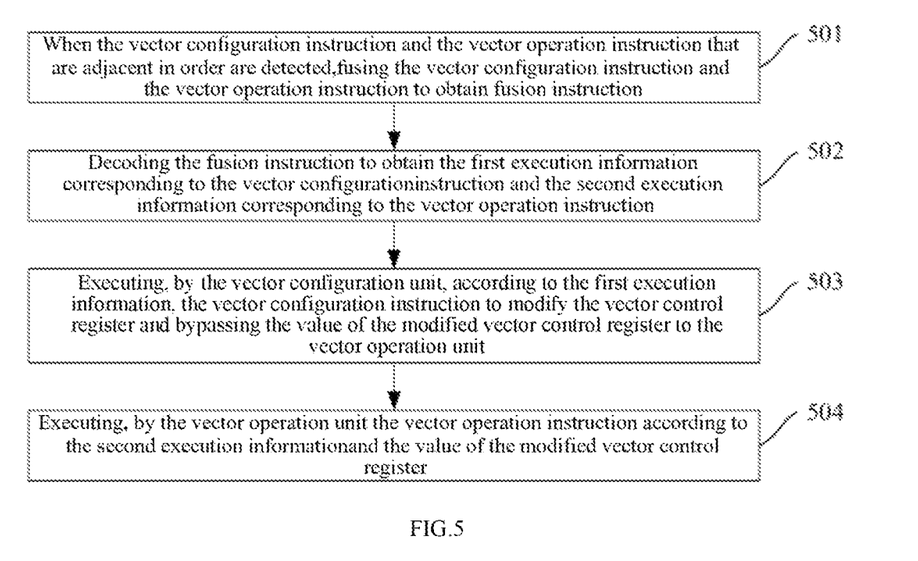
FIG. 5 is a flowchart of an instruction processing method according to an embodiment of the present application.

FIG. 5 is a flowchart of an instruction processing method according to one embodiment of the present application. The instruction processing method may be executed by the processing unit 12 in the above embodiments. As shown in FIG. 5, the instruction processing method includes the following Step 501 to Step 504.

Step 501: in response to detecting that vector configuration instruction and vector operation instruction that are adjacent in order, fusing the vector configuration instruction and the vector operation instruction to obtain fusion instruction;

Step 502: decoding the fusion instruction to obtain the first execution information corresponding to the vector configuration instruction and the second execution information corresponding to the vector operation instruction;

Step 503: executing, by the vector configuration unit, the vector configuration instruction according to the first execution information to modify the vector control register, and bypassing the value of the modified vector control register to the vector operation unit;

Step 504: executing, by the vector operation unit, the vector operation instruction according to the second execution information and the value of the modified vector control register.

In the embodiment of the application, after fusing the vector configuration instruction and the vector operation instruction that are adjacent in order into a fusion instruction, the fusion instruction is decoded to enable the vector configuration instruction and vector operation instruction to be executed simultaneously. After the vector configuration unit executes the vector configuration instruction to modify the vector control register, the value of the modified vector control register is bypassed to the vector operation unit, The vector operation unit executes the vector operation instruction based on the value of the modified vector control register acquired by the bypass. Through the instruction fusion of the vector configuration instruction and the vector operation instruction, and the modification result of the vector control register by the vector configuration instruction is bypassed to the vector operation unit, the vector operation unit does not need to wait for the completion of the execution of the vector configuration instruction before executing the vector operation instruction. Therefore, the vector configuration instruction and the vector operation instruction may be executed simultaneously, which may shorten the execution delay between the vector configuration instruction and the vector operation instruction, and therefore the efficiency of vector operation of the processing unit may be improved.

In one possible implementation, in response to fusing the vector configuration instruction and the vector operation instruction to obtain the fusion instruction, the instruction code of the vector configuration instruction may be decoded, and the decoding result may be stored in the additional decoding domain, and the instruction type information used to indicate that the fusion instruction has been obtained by fusing the vector configuration instruction and the vector operation instruction may be stored in the additional decoding domain, and then an instruction code of the vector operation instruction, which is taken as main decoding information, is fused with the additional decoding domain to obtain the fusion instruction.

In one possible implementation, when decoding the fusion instruction, the main decoding information included in the fusion instruction and the additional decoding domain may be decoded respectively, and the first execution information and the second execution information may be obtained according to the instruction type information stored in the additional decoding domain.

In one possible implementation, the instruction processing method also includes: assigning instruction identifier for the fusion instruction, sending the first execution information to the vector configuration unit, and sending the second execution information to the vector operation unit. In the implementation, the instruction identifier is used to determine the new-old relationship of different instructions, and the instruction identifiers of the vector configuration instruction and vector operation instruction are same as the instruction identifier of the fusion instruction.

In one possible implementation, when the vector operation instruction is executed according to the second execution information and the value of the modified vector control register, the value of the modified vector control register is bypassed by the vector configuration unit is received, determining whether the instruction identifier of the currently executed instruction is same with the instruction identifier of the vector configuration instruction. If the instruction identifier of the currently executed instruction is same with the instruction identifier of the vector configuration instruction, the value of the modified vector control register is used to execute the currently execute instruction.

In one possible implementation, the instruction processing method also includes: in a case where the instruction identifier of the currently executed instruction is determined to be different from the instruction identifier of the vector configuration instruction, determining the new-old relationship between the currently executed instruction and the vector configuration instruction according to the instruction identifier. If the currently executed instruction is newer than the vector configuration instruction, the current executed instruction is executed using the value of the modified vector control register. If the currently executed instruction is older than the vector configuration instruction, the value of the vector control register before the modification is used to execute the currently executed instruction.

In one possible implementation, the instruction processing method also includes: after bypassing the value of the modified vector control register to the vector operation unit, after determining the vector configuration instruction is normally executed and allowed to be submitted, the vector control register is updated and write back the result.

In one possible implementation, the first execution information includes at least one of the following: the general register value, the general register number, the target general register number and the instruction decoding information. The second execution information includes at least one of the following: the source vector register value, the destination vector register number, and the instruction decoding information.

It should be noted that, since detailed description has been made in combination with the structure diagram to the details of the instruction processing method in the processing unit part of the above embodiment, the specific process may be referred to the description of the above processing unit embodiment, which will not be repeated here.

Computer Storage Media

The application also provides a computer-readable storage medium, the computer-readable storage medium stores instructions for enabling a machine to execute an instruction processing method as described herein. Specifically, it is possible to provide a system or device equipped with a storage medium, software program codes that implement the functions of any of the above embodiments are stored in the storage medium, and enable the computer (or CPU or MPU) of the system or device to read and execute the program codes stored in the storage medium.

In this case, the program code read from the storage medium itself can realize the function of any of the above embodiments. Therefore, the program code and the storage medium storing the program code constitute a part of the application.

The storage medium embodiments for providing program code include floppy disk, hard disk, magneto-optical disk, optical disk (such as CD-ROM, CD-R, CD-RW, DVD-ROM, DVD-RAM, DVD-RW, DVD+RW), tape, non-volatile memory card, and ROM. Optionally, the program code can be downloaded from the server computer by the communication network.

Computer Program Products

The embodiment of the application also provides a computer program product, including computer instruction, the computer instruction indicate the computing device to perform any corresponding operation in the multiple method embodiments above.

The Commercial Value of the Embodiment of the Application

In the embodiment of the application, in response to determining the execution delay between the sequential adjacent vector configuration instruction and the vector operation instruction is larger, through the instruction fusion of the vector configuration instruction and the vector operation instruction, the modification result of the vector control registers by the vector configuration instruction is bypassed to the vector operation unit, and the vector operation unit does not need to wait for the completion of the vector configuration instruction before executing the vector operation instruction, the vector configuration instruction and vector operation instruction can be executed simultaneously, so that the execution delay between the vector configuration instruction and the vector operation instruction can be shortened, and the efficiency of the processing unit for vector operation can be improved.

It should be understood that each embodiment in this specification is described in progressive manner, and the same or similar parts of each embodiment can be referred to each other. Each embodiment focuses on the differences with other embodiments. In particular, the method embodiments are basically similar to the methods described in the device and system embodiment, so the description is relatively simple. Refer to the partial description of other embodiments for relevant points.

It should be understood that the specific embodiments of this specification have been described above. Other embodiments are within the scope of the claims. In some cases, the actions or steps recorded in the claims can be performed in a sequence of different embodiments and the desired results may still be achieved. In addition, the process depicted in the drawings does not necessarily require a particular order or a sequential order shown to achieve the desired result. In some embodiments, multitasking and parallel processing are also possible or may be advantageous.

It should be understood that element described in singular form herein or shown only one in the drawings do not mean the number of this element is limited to one. In addition, modules or elements described or shown as separate herein can be combined into a single module or element, and module or element described or shown as a single herein can be divided into multiple modules or elements.

It should also be understood that the terms and expressions used herein are only for description, at least one embodiments of this specification should not be limited to these terms and expressions. The use of these terms and expressions does not means the exclusion of any equivalent features of illustrations and descriptions (or parts thereof). It should be recognized that various possible modifications should also be included in the scope of claims. Other modifications, changes and replacements may also exist. Accordingly, the claims are deemed as cover all such equivalents.

What is claimed is:

1. A computing device for fusing and executing vector instructions, comprising:
    a memory and a processor;
    wherein the memory is coupled to the processor and is used for storing computer-executable instructions, which, when executed by the processor, enable the processor to:
    in response to detecting a vector configuration instruction and a vector operation instruction that are adjacent in order, fuse the vector configuration instruction and the vector operation instruction to obtain a fusion instruction;
    decode the fusion instruction to obtain first execution information corresponding to the vector configuration instruction and second execution information corresponding to the vector operation instruction;

execute, according to the first execution information, the vector configuration instruction to modify a vector control register and bypass a value of the modified vector control register;

execute the vector operation instruction according to the second execution information and the value of the modified vector control register;

assign an instruction identifier for the fusion instruction, and send the first execution information and the second execution information, wherein the instruction identifier is used to determine new-old relationship of different instructions, and instruction identifiers of the vector configuration instruction and the vector operation instruction are the same as the instruction identifier of the fusion instruction; and receive the value of the modified vector control register bypassed, determine whether an instruction identifier of a currently executed instruction is the same as the instruction identifier of the vector configuration instruction, wherein in response to determining that the instruction identifier of the currently executed instruction is the same as the instruction identifier of the vector configuration instruction, the currently executed instruction is executed by using the value of the modified vector control register.

2. The computing device according to claim 1, wherein the fusing the vector configuration instruction and vector operation instruction to obtain the fusion instruction further comprises:

decoding an instruction code of the vector configuration instruction;

storing a decoding result into an additional decoding field;

storing instruction type information, which indicates the fusion instruction has been fused by the vector configuration instruction and the vector operation instruction, into the additional decoding field; and fusing an instruction code of the vector operation instruction, which is taken as main decoding information, with the additional decoding field to obtain the fusion instruction.

3. The computing device according to claim 2, wherein the decoding the fusion instruction to obtain the first execution information corresponding to the vector configuration instruction and the second execution information corresponding to the vector operation instruction comprises:

decoding the main decoding information included in the fusion instruction and the additional decoding field respectively after receiving the fusion instruction; and obtaining the first execution information and the second execution information according to the instruction type information stored in the additional decoding field.

4. The computing device according to claim 1, wherein
in response to determining that the instruction identifier of the currently executed instruction is different from the instruction identifier of the vector configuration instruction, determine, according to the instruction identifiers, the new-old relationship between the currently executed instruction and the vector configuration instruction, wherein in response to determining that the currently executed instruction is newer than the vector configuration instruction, the value of the modified vector control register is used to execute the currently executed instruction; and in response to determining that the currently executed instruction is older than the vector configuration instruction, a value of the vector control register before modification is used to execute the currently executed instruction.

5. The computing device according to claim 1, wherein the executing, according to the first execution information, the vector configuration instruction to modify the vector control register and bypass the value of the modified vector control register further comprises:

after the value of the modified vector control register has been bypassed, and after determining that the vector configuration instruction has been normally executed and is allowed to be submitted, updating the vector control register and writing back a result.

6. The computing device according to claim 1, wherein
the first execution information comprises at least one of the following: general register value, general register number, destination general register number and instruction decoding information; and the second execution information comprises at least one of the following: source vector register value, destination vector register number and the instruction decoding information.

7. A method for fusing and executing vector instructions, comprising:

in response to detecting a vector configuration instruction and a vector operation instruction that are adjacent in order, fusing the vector configuration instruction and vector operation instruction to obtain a fusion instruction;

decoding the fusion instruction to obtain first execution information corresponding to the vector configuration instruction and second execution information corresponding to the vector operation instruction;

executing, according to the first execution information, the vector configuration instruction to modify a vector control register and bypass a value of the modified vector control register;

executing, the vector operation instruction according to the second execution information and the value of the modified vector control register;

assigning an instruction identifier for the fusion instruction, and sending the first execution information and the second execution information, wherein the instruction identifier is used to determine new-old relationship of different instructions, and instruction identifiers of the vector configuration instruction and the vector operation instruction are the same as the instruction identifier of the fusion instruction; and receiving the value of the modified vector control register bypassed, determining whether an instruction identifier of a currently executed instruction is the same as the instruction identifier of the vector configuration instruction, wherein in response to determining that the instruction identifier of the currently executed instruction is the same as the instruction identifier of the vector configuration instruction, the currently executed instruction is executed by using the value of the modified vector control register.

8. The method according to claim 7, wherein the fusing the vector configuration instruction and vector operation instruction to obtain the fusion instruction further comprises:

decoding an instruction code of the vector configuration instruction;

storing a decoding result into additional decoding field;

storing instruction type information, which indicates the fusion instruction has been fused by the vector configuration instruction and the vector operation instruction, into the additional decoding field; and fusing an instruction code of the vector operation instruction, which is taken as main decoding information, with the additional decoding field to obtain the fusion instruction.

9. The method according to claim 8, wherein the decoding the fusion instruction to obtain the first execution information corresponding to the vector configuration instruction and the second execution information corresponding to the vector operation instruction comprises:

decoding the main decoding information included in the fusion instruction and the additional decoding field respectively after receiving the fusion instruction; and obtaining the first execution information and the second execution information according to the instruction type information stored in the additional decoding field.

10. The method according to claim 7, wherein the executing, according to the first execution information, the vector configuration instruction to modify the vector control register and bypass the value of the modified vector control register further comprises:

after the value of the modified vector control register has been bypassed, and after determining that the vector configuration instruction has been normally executed and is allowed to be submitted, updating the vector control register and writing back a result.

11. The method according to claim 7, wherein, the first execution information comprises at least one of the following: general register value, general register number, destination general register number and instruction decoding information; and the second execution information comprises at least one of the following: source vector register value, destination vector register number and the instruction decoding information.

12. The method according to claim 7, wherein in response to determining that the instruction identifier of the currently executed instruction is different from the instruction identifier of the vector configuration instruction, determine, according to the instruction identifiers, the new-old relationship between the currently executed instruction and the vector configuration instruction, wherein in response to determining that the currently executed instruction is newer than the vector configuration instruction, the value of the modified vector control register is used to execute the currently executed instruction; and in response to determining that the currently executed instruction is older than the vector configuration instruction, a value of the vector control register before modification is used to execute the currently executed instruction.

* * * * *